F. G. MOWER.
FRUIT PARER.
APPLICATION FILED JUNE 14, 1906.
923,561.
Patented June 1, 1909.
3 SHEETS—SHEET 3.
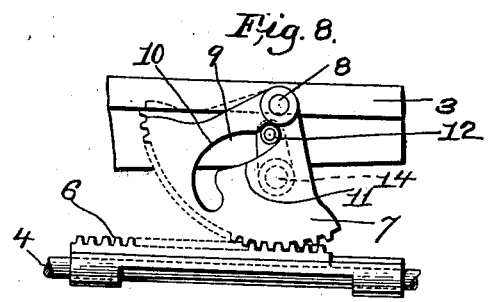
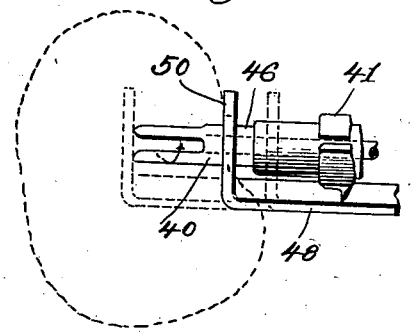
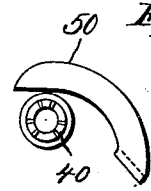
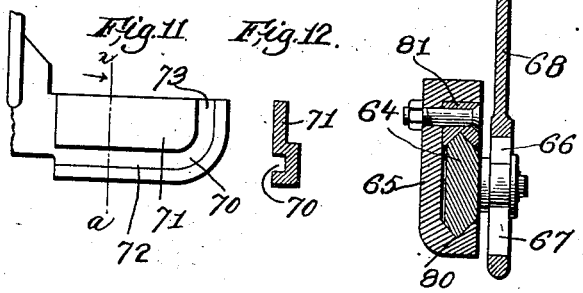
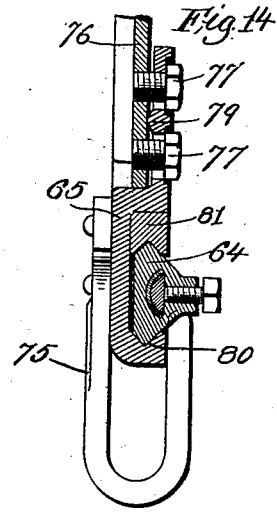
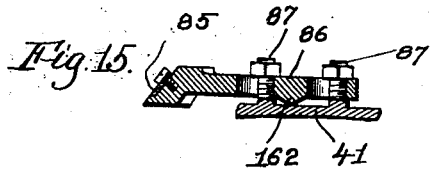
Witnesses.
W. C. Lunsford.
W. L. Priary.
Inventor.
Fred G. Mower.
by Crosby Gregory
Attys.

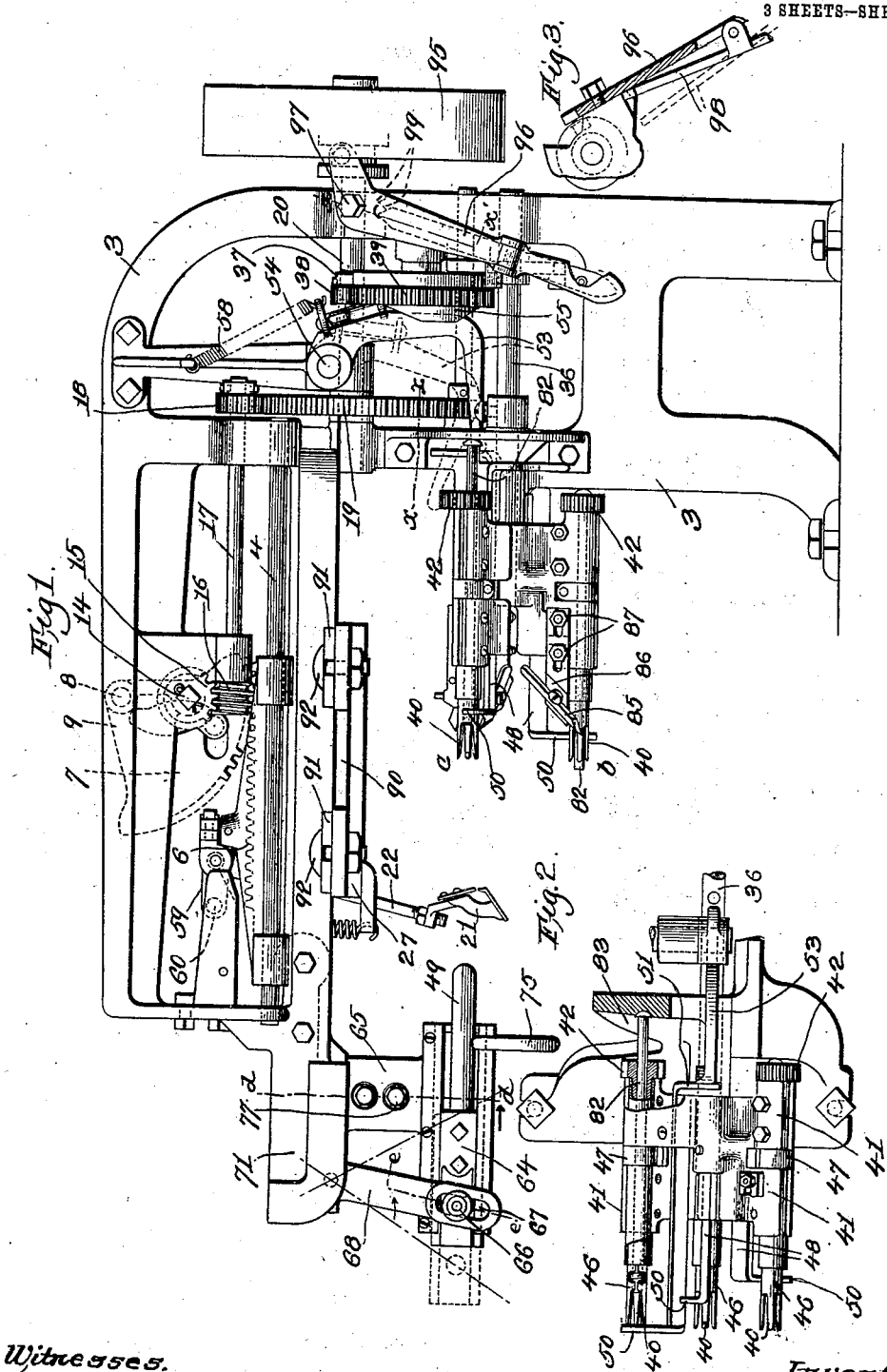

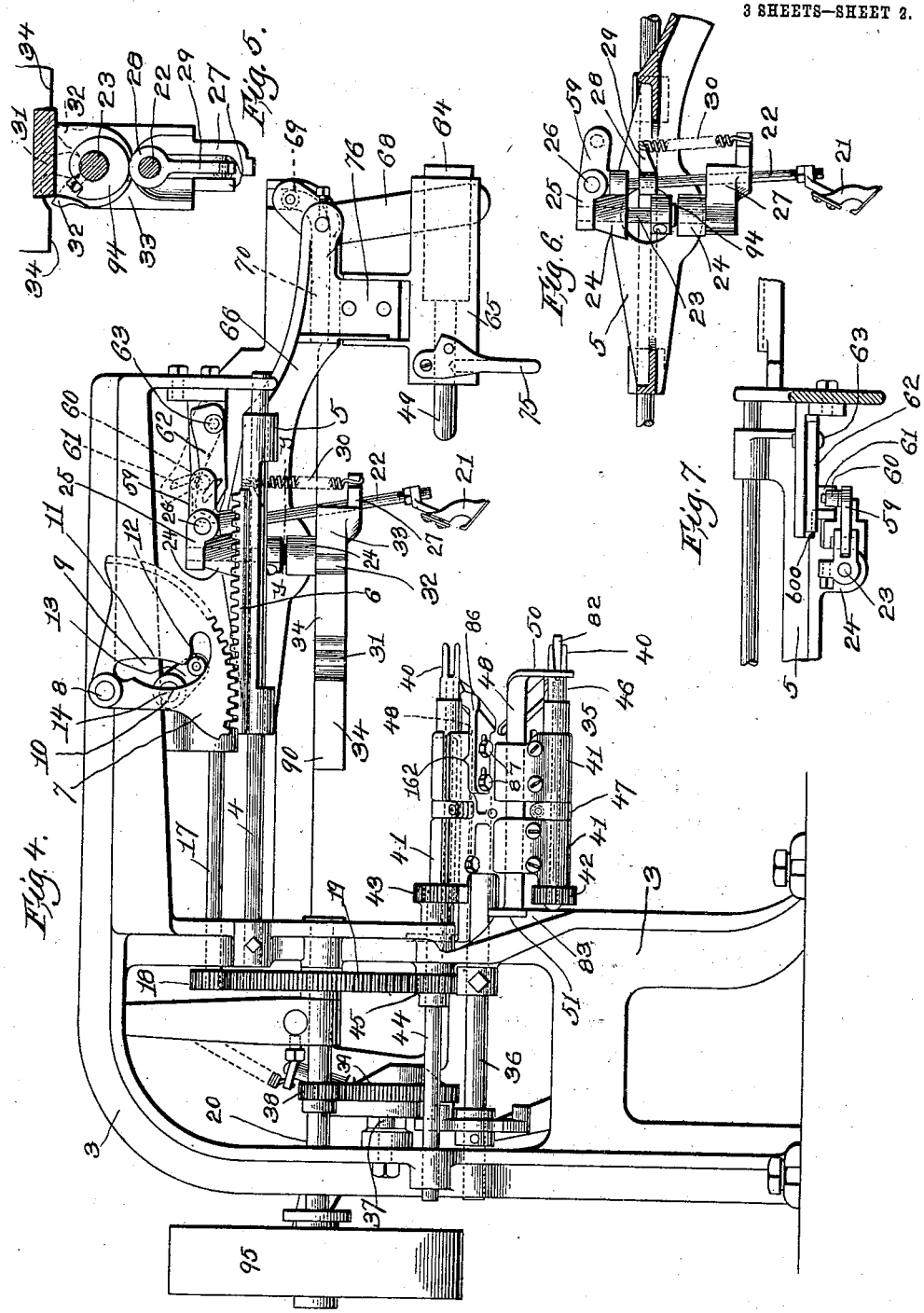

UNITED STATES PATENT OFFICE.

FRED G. MOWER, OF ANTRIM, NEW HAMPSHIRE, ASSIGNOR TO GOODELL COMPANY, OF ANTRIM, NEW HAMPSHIRE, A CORPORATION OF NEW HAMPSHIRE.

FRUIT-PARER.

No. 923,561.                Specification of Letters Patent.        Patented June 1, 1909.

Application filed June 14, 1906.  Serial No. 321,614.

*To all whom it may concern:*

Be it known that I, FRED G. MOWER, a citizen of the United States, residing at Antrim, county of Hillsboro, and State of New Hampshire, have invented an Improvement in Fruit-Parers, of which the following description, in connection with the accompanying drawing, is a specification, like numerals on the drawings representing like parts.

This invention relates to fruit parers, and it has for its object to improve generally devices of this class, all as more particularly hereinafter described and then pointed out in the appended claims.

In the drawings, Figure 1 is a front side view of a fruit parer embodying my invention; Fig. 2 is a section on the line x—x, Fig. 1; Fig. 3 is a detail of the clutch-operating lever; Fig. 4 is a rear elevation of the machine; Fig. 5 is a section on the line y—y, Fig. 4; Fig. 6 is a detail of the turn-table supporting the knife; Fig. 7 is a plan view of the turn-table showing the tripping device therefor; Fig. 8 is a detail view of the segmental gear for operating the carriage; Fig. 9 is a detail of the fork and the push-off; Fig. 10 is an end view of Fig. 9; Fig. 11 is a detail of the cam groove 70 in the frame; Fig. 12 is a section on line a—a, Fig. 11; Fig. 13 is a section on line e—e, Fig. 1; Fig. 14 is a section on line d—d, Fig. 1; Fig. 15 is a sectional view of the trimming knife holder.

The fruit parer herein shown embodies the essential elements of power fruit parers as now commonly constructed, that is, it has a frame, a knife-carriage slidably mounted on the frame and carrying the paring-knife, a fork-reel having a plurality of forks therein for receiving the apple, means to turn the reel intermittingly, and a coring-spoon adapted to core the apple after it is pared, and after it is on the fork.

My invention has for its object to improve these various elements of the parer to secure a better coöperative relation between them and more efficient results.

The frame, which may have any suitable or usual construction, is designated generally by 3. It is provided with a way 4 on which is slidably mounted a carriage 5 supporting the turn-table carrying the paring-knife. This carriage is moved back and forth on the frame by a novel mechanism which I will first describe.

The carriage has rigid therewith a rack 6 with which mesh teeth on a segmental gear 7, the latter being suitably pivoted to the frame, as at 8.

The gear is provided with a cam-slot 9 having the two cam surfaces 10 and 11, and a roll 12 carried by a crank-arm 13 rigid with a shaft 14 operates in said cam-groove. The shaft 14 is constantly rotated in one direction, and for this purpose, it has thereon a worm-gear 15 which meshes with and is driven by a worm 16 fast on a shaft 17.

The shaft 17 carries a pinion 18 which meshes with and is driven by a driving-gear 19 fast on the driving shaft 20.

During the continuous rotation of the crank-shaft 14, the roll 12 first engages the cam-surface 10, thereby swinging the segmental gear in a direction to move the carriage to the right Fig. 1, or to the left Fig. 2, thus bringing the paring-knife into operative position for paring the fruit, and when the carriage has reached the end of its inward stroke, the roll 12 passes off from the cam-surface 10 and engages the cam-surface 11, as seen in Fig. 8, the engagement of the roll 12 with the cam surface 11 during the continued rotation of the shaft 14 turning the segmental gear in the direction to return the carriage to its outward position.

Since the cam surface 11 is nearer the center of motion 8 than the cam surface 10, the outward movement of the carriage will obviously be quicker than the inward movement thereof.

The paring-knife is designated by 21 and is carried by an arm or rod 22 which is supported by a turn-table. This turn-table comprises a shaft or spindle 23 suitably journaled in bearings 24 carried by the carriage, and having at its upper end a head 25 to which the upper end of the knife-rod 22 is pivoted, as at 26. The lower end of the knife-rod is received between two arms 27, see Fig. 5, said arms operating to guide it in its swinging movement. Fast to the rod 22 is a hub 28 having an arm 29 to which is fastened one end of a spiral-spring 30, the other end of said spring being fast to a projecting end of one of the arms 27. The spring 30 is for the purpose of normally holding the knife-rod 22 in its inward position, as shown in Fig. 6, said spring yielding to permit the rod to swing outwardly as it rounds an apple during the paring operation. The turn-table is given its turning movement during the reciprocating movement of the carriage by means of a single tooth or projection 31 carried by the frame and two teeth or projections 32 carried by the turn-table. These teeth or projections 32 are shown as being formed on a foot 33 which is rigid with the shaft 23. Extending either side of the tooth 31 is a guideway 34 against which one or the other side of the foot 33 rests during the movement of the carriage. The object of using one tooth only on the frame and two teeth or a notch on the turn-table is to provide a means for giving the knife its turning movement within a very small movement of the carriage.

Looking at Fig. 4, for instance, it will be seen that one side of the foot 33 is resting against the trackway or guide 34. As the carriage moves inwardly, the turn-table retains this same position with the foot 33 resting against the way 34 until one of the teeth 32 strikes the tooth 31 on the frame. At this point, the turn-table begins to turn and it will swing from the position shown in Fig. 4 through 180° during a very small movement of the carriage, this movement taking place as the knife turns about the apple while paring the same.

When the turn-table has been completely turned, the other side of the foot 33 will rest against the guide-face 34, as will be obvious. It will be noted that the foot 33 and the teeth 32 extend from the shaft 23 in opposite directions. The teeth 32 not only operate to turn the turn-table but they also serve as a means to hold the turn-table firmly in position with the side of the foot 33 in engagement with the guide face 34 after the turn-table has been turned and during the further movement of the knife-carriage. When said turn-table has thus been fully turned and is in the position shown in the drawings, one side of the foot 33 and also one tooth 32 lie against the guide face 34 and because said foot and said tooth are on opposite sides of the shaft 23, said turn-table is firmly held in its position until the knife-carriage has moved to bring the turn-table opposite the tooth 31 when the turning movement of the turn-table is accomplished. The shape of the foot is such that the turn-table is given a movement through 180°. This is essential in order to completely pare the ends of the fruit.

It is a desideratum in apple parers to obtain a quick turning movement of the turn-table, and I have found after considerable experiment that by using one tooth on the carriage and a notch or two teeth on the turn-table, I am enabled to get this desired quick turning movement of the turn-table.

The member carrying the tooth 31 is made adjustable so as to take up any wear as it occurs. As herein shown, this tooth 31 is mounted on a member 90 made with the guideway 34, and said member is secured to slotted feet 91 projecting from the frame of the machine by means of bolts 92. This construction permits the member 90 to be adjusted laterally as wear occurs.

The fork-reel is designated generally by 35, and as herein shown it supports three forks. It is mounted on and rigidly carried by a shaft 36 which is driven from the shaft 20 and given an intermittent rotary motion by any well known mechanism which is adapted to convert a continuous rotary motion into an intermittent rotary motion.

The forks of the fork-reel are designated by 40 and they are formed on the end of hollow tubes 46 which are received in suitable bearings 41 formed on the reel, there being two bearings for each tube. At one end each fork tube 46 has a gear 42 which is adapted to mesh with a driving gear 43 on a shaft 44 at the time that the knife is acting upon the fruit supported by the corresponding fork. The shaft 44 is driven from the driving-shaft 20 by means of a gear 45 which meshes with the gear 19. Each fork-tube 46 is held from longitudinal movement in the bearing by a suitable collar 47 which is adjustably mounted on the tube and which is received between the two bearings 41. As wear occurs, the collars may be adjusted on the tube so as to insure that the forked end thereof will occupy the proper position.

48 designates a push-off device adapted to push the apple off from the fork after the paring operation, the apple at this time being received by the coring-spoon 49 which has been advanced as will be more fully hereinafter described. This push-off device may be made in various ways and preferably it has such a construction that it acts both as a push-off for the apple and as a stop to position the apple as it is being placed on the fork. There is one push-off device for each fork, and each push-off device is slidably mounted in the fork-reel and is provided at one end with a head 50 adapted to engage the apple and at the other end with a foot 51.

After the apple has been pared, it is pushed off from the fork by giving the push-off device a longitudinal movement to the right Fig. 4 or to the left Fig. 1. This movement may be given to the push-off in various ways, and as one convenient means for accomplishing it, I have shown a hinged push-off arm 53 hinged to the frame, as at 54, and actuated by a cam 55 carried by the gear 39 which is driven from the shaft 20 by means of the gear 38. 58 is a spring acting on the push-off arm holding it against the face of the gear. As the gear rotates, the cam 55 acts on the push-off arm 53, thereby swinging it into the dotted line position Fig. 1, thereby causing its free end to impinge against the foot 51 of the push-off device and give the latter its movement to the left Fig. 1 and pushing the apple from the fork onto the coring-spoon 49.

The apple is inserted on the fork when it is in the position of fork b shown in Fig. 1, and when the fork is in this position, the foot 51 of the corresponding push-off engages a suitable fixed abutment such as the frame 3, whereby the head of the push-off acts as a stop to position the apple as it is being placed on the fork, as shown in full lines Fig. 9. When the reel turns, however, at the proper time to bring the fork into the position designated by c in Fig. 1, in which position the gear 42 thereon is brought into mesh with the driving-gear 43, the foot of the push-off device passes out of engagement with the abutment so that said push-off is free to move backward. If the apple is uneven or has been unevenly placed on the fork, the rotation of the apple during the paring operation will slide the push-off back sufficiently so that the apple may be freely rotated without becoming loosened from the fork. This will be better understood by a reference to Fig. 9, wherein the full line positions show the push-off device in the position it occupies when the apple is placed on the fork, and the dotted lines to the right show how if the apple is irregular or has been placed on the fork at an angle, the push-off may slide backwardly as the apple rotates, thus preventing the apple from being loosened from the fork. If the head 50 which forms the stop for the apple did not have any movement into the dotted line position, an apple such as shown in Fig. 9 would by its rotation become loosened from the fork, thus preventing the proper paring thereof.

The various parts are so timed that the carriage begins its inward movement at the time that the reel turns to bring a fresh unpared fruit into the position to be acted upon by the knife.

In some apple parers when the fruit is large the knife is apt to be brought against the apple before the reel has been brought to rest, and when this occurs, the apple is sometimes either knocked off from the fork or is so loosened thereon that the paring cannot be properly done.

In my improved device, I provide a novel means for positively holding the knife out of engagement with the fruit no matter how large the latter may be until the reel has been brought to rest and the apple set in rotation. This is accomplished in the present embodiment of my invention by pivoting the knife-rod 22 to the head 25, as at 26, and forming rigid with said knife-rod an arm 59 carrying a projection or roll 60 which is adapted to engage a cam 61 carried on a member or latch 62 pivoted to the frame, as at 63. The cam 61 is so shaped that as the carriage moves backwardly toward the end of its stroke, the roll 60 passes under it, thereby swinging the latch 62 upwardly. When the carriage begins its inward or forward stroke, however, the roll 60 moves over the top of the cam 61 and by its engagement with the inclined surface thereof, the knife 21 is swung backwardly relative to the carriage. While the roll 60 is moving over the top of the cam 61 the latch 62 is held against downward movement by the ledge 600 projecting from the frame 3. This backward movement is substantially sufficient not only to counteract the forward movement of the carriage but to give the knife an actual backward movement during the initial forward movement of the carriage.

When the roll passes off from the cam 61 the spring 30 brings the knife-rod back into its normal position, but by this time the reel has been brought to rest and the fruit to be pared set in rotation.

In all fruit parers with which I am familiar, the coring-spoon is pivotally mounted on the carriage and moves in the arc of a circle when approaching the apple to be pared, and when the pared and cored apple is being doffed.

In my present invention I have provided means whereby the coring-spoon has a right line movement only, and while various devices may be employed for thus giving the coring-spoon its right line movement, I have in this embodiment of my invention shown said coring-spoon as carried by a holder 64 which is mounted to reciprocate in ways in a bracket 65 depending from an arm 76 projecting from the carriage.

The holder 64 has projecting therefrom a stud or roll 66 which enters a slot 67 in one end of a lever 68 which is pivoted to the arm 76, the other end of said lever having a roll or stud 69 which is adapted to play in a curved groove 70 formed in the projecting portion 71 of the frame.

The groove 70 has the shape shown in Fig. 11, that is, it has a horizontal portion 72 and the curved portions 73.

As the carriage starts inwardly to pare the fruit, the coring-spoon is projected into the dotted line position, Fig. 4, and as the carriage completes its inward stroke, the coring-spoon enters the apple and cuts the core therefrom. When the carriage begins its outward movement the push-off 48 comes into operation to push the apple from the fork and said apple is then taken by the coring-spoon and carried backwardly with the latter. As the carriage completes the end of its outward stroke, the projection 69 enters the vertical portion of the groove 70, thereby causing the coring-spoon to be withdrawn quickly into the dotted line position Fig. 1. During this movement of the coring-spoon, the apple is doffed from the fork by means of the doffer 75. This doffer may have any suitable shape, but preferably it is arranged to engage the apple on both sides of the coring-spoon. I have shown it as substantially U-shape, and as carried by the bracket 65, see Fig. 14. The mechanism herein shown for moving the coring-spoon is such that the said coring-spoon is given an easy movement without any jerking or banging.

It is essential that the coring-spoon be properly adjusted so as to be in exact alinement with the fork. In my improved parer I have provided means for thus accurately adjusting said coring-spoon.

The bracket 65 is secured directly to an arm 76 forming part of the carriage by means of set screws or bolts 77, which enter slots formed either in the arm 76 or in the bracket 65, thus permitting the bracket to be vertically adjusted see Fig. 14. Lateral adjustment of the bracket is provided for as shown in Fig. 14. From this it will be seen that either the bracket 65 or the arm 76 is provided with a projection or lug 79 between the two bolts 77 so that by tightening up one bolt and loosening the other, the coring-spoon may be adjusted laterally. I regard this adjustment of the coring-spoon as an important feature.

In order to take up wear between the holder 64 and the bracket, I have made one of the guides for the holder adjustable. As shown in Fig. 13, one edge of the holder rests in a groove or way 80 made integral with the bracket, and the other edge is guided in an adjustable way 81. Said way may be made adjustable by any suitable means, and as herein shown the clamping screws 199 which clamp it to the bracket 65 extend through slots in said bracket, as shown in Fig. 13.

Apples are usually placed upon the fork with the stem end first. In my improved machine I have provided for trimming around the stem so as to completely pare the apple. This is done by means of trimming knives 85, there being one for each of the forks.

Each knife 85 is shown as mounted in a holder 86, and the construction is such that each knife may be adjusted transversely of the fork or longitudinally thereof. The longitudinal adjustment is preferably provided by making the knife-holders 86 adjustable, said holders being held in place by bolts 87 which enter slots in the holder. The adjustment of the knife transversely of the fork is provided for by adjustably mounting the knife on the holder.

The knife-holders 86 are also shown as having the ribs 162 which engage the bearing of the fork-reel, said rib being placed between the two bolts 87 which secure the holder in place.

By tightening one bolt and loosening the other the paring knife may be adjusted toward and from the fork. This adjustment, together with the longitudinal movement of the holder and the adjustment of the knife-blade 85 in the holder, provides for adjusting the knife into any desired position.

One decided advantage gained by making the knife 85 straight and detachable from the holder is that the knife may be readily ground to the proper shape by simply removing it from the holder.

The shaft 23 is shown as having an eccentric-shaped sleeve 94 adjustably mounted thereon, which sleeve is adapted to be engaged by the hub or collar 28 on the knife-rod 22. By adjusting this sleeve into different positions, the knife may be adjusted to pare larger or smaller fruit as desired.

The machine is operated by means of a driving pulley 95 which is adapted to be clutched to the shaft 20 by any suitable clutch mechanism. This clutch mechanism is operated by a clutch operating lever 96 which is pivoted to the frame, as at 97, and which is located in either of its adjusted positions by means of a locking latch 98 pivoted to the lever 96. This locking latch is adapted to engage in one of two notches 99 formed in the frame, thereby to lock the clutch in or out of engagement.

From the above it will be seen that I have improved these paring machines in several particulars, and although I have shown herein the best embodiment of my invention, yet I do not wish to be limited to the precise construction illustrated.

Having described my invention what I claim as new and desire to secure by Letters Patent is:—

1. In a fruit parer, a frame, a knife carriage slidably mounted thereon, carriage-reciprocating mechanism supported by the frame, a knife-rod pivoted to the carriage and having an arm extending therefrom, and a cam projection movably carried by the frame and normally in the path of said arm, said projection being movable in one direction to permit the arm to pass during the final outward movement of the carriage and said arm engaging the cam projection during the initial portion of the inward movement of the carriage and operating to swing the knife-rod backwardly.

2. In a fruit parer, a frame, a knife carriage slidably mounted thereon, carriage-reciprocating mechanism supported by the frame, a knife-rod pivoted to the carriage and having extended therefrom an arm provided with a projection, a member 62 pivoted to the frame and having an inclined cam projection 61 situated in the path of the projection on the arm, and means to limit the downward movement of said member 62 whereby the projection on the arm passes under the cam during the outward movement of the carriage and passes over said cam during the inward movement thereby swinging the knife-rod backwardly.

3. In a fruit parer, a frame, a knife-carriage slidably mounted thereon, carriage-reciprocating mechanism supported by the frame, a knife-rod pivoted to the carriage and having an arm extending therefrom, and a cam surface carried by the frame and adapted to be engaged directly by said arm during the initial forward movement of the carriage, thereby to swing the knife-rod backwardly with relation to the carriage.

4. In a fruit parer, a frame, a knife-carriage slidably mounted thereon, carriage-reciprocating mechanism supported by the frame, a knife-rod pivoted to the carriage and having an arm extending therefrom; a cam member pivoted to the frame and having a cam adapted to be engaged directly by said arm during the initial forward movement of the carriage whereby the knife-rod is swung backwardly during such initial movement.

5. In a fruit parer, a frame, a knife carriage slidably mounted thereon, carriage-reciprocating mechanism supported by the frame, a turn table provided with a shaft 23 journaled on the carriage, a knife rod carried by said shaft, said frame having a guiding face and a single tooth extending therefrom beyond the face and nearly to the vertical plane in which the shaft moves as the carriage reciprocates, a foot rigid with said shaft and having two side faces to engage the guiding face on the frame after the turn-table has been turned, said foot having at its rear end two separated teeth or projections adapted to engage the tooth extending from the frame as the carriage reciprocates.

6. In a fruit parer, a frame, fruit-holding devices, paring mechanism, a slotted bracket having ways and also having a rib which engages the frame, bolts extending through the slots in said bracket for adjustably securing the bracket rigidly to the frame, a coring spoon in said ways, and means to operate the coring spoon.

7. In a fruit parer, a frame, a rotary fork, paring mechanism, a coring spoon, means to move the coring spoon toward and from the fork, and a guide for the coring spoon adapted to give the coring spoon a movement in a straight line, said coring spoon being adjustable both vertically and horizontally relative to its operating mechanism.

8. In a fruit parer, a frame, a knife carriage slidably mounted thereon, a knife sustained by said carriage, a coring spoon, straight guides or ways for the coring spoon, and means to give the coring spoon a movement on said ways relative to the carriage.

9. In a fruit parer, a frame, a knife carriage slidably mounted thereon and having horizontally-arranged ways, a coring spoon slidably mounted in said ways, and means to move the coring spoon on said ways during the movement of the carriage.

10. In a fruit parer, a frame, a knife carriage slidably mounted thereon, said knife carriage having ways extending parallel to the direction of movement of said carriage, a coring spoon mounted in said ways, and means to operate said coring spoon.

11. In a fruit parer, a frame, a knife carriage slidably mounted thereon, said knife carriage having ways extending parallel to its direction of movement, a coring spoon slidably mounted in said ways, and means operated by the movement of the carriage to move said coring spoon on said ways.

12. In a fruit parer, a frame, a knife-carriage slidably mounted thereon, a coring spoon mounted on said knife carriage, means to move the coring spoon relative to the knife carriage, and guides for said coring spoon coöperating with said means to give the coring spoon a right line movement.

13. In a fruit parer, a frame, a knife-carriage slidably mounted thereon, said knife-carriage having horizontally arranged ways, a coring spoon slidably mounted in said ways, an arm pivoted to the carriage and pivotally connected with the coring spoon, said arm having a projection, and a cam slot carried by the frame and receiving said projection.

14. In a fruit parer, a frame, a knife-carriage slidably mounted thereon, a bracket adjustably secured to said carriage, said bracket having ways, a coring spoon mounted to slide freely in said ways and means to move said coring-spoon on said ways.

15. In a fruit parer, a frame, a knife-carriage slidably mounted thereon, and a bracket mounted thereon and adjustable both vertically and laterally, a coring spoon slidably mounted in said bracket to move in a right line, and means to move the coring spoon on the bracket as the carriage moves.

16. In a fruit parer, a frame, a knife-carriage slidably mounted thereon, a bracket having a rib to engage said frame, two adjusting screws, one either side of said rib for securing the bracket to the frame, a coring-spoon slidably mounted on said bracket for movement in a right line, and means to give the coring-spoon its right line movement.

17. In a fruit parer, a frame provided with a cam-slot having a horizontal and a vertical portion, a knife-carriage slidably mounted on the frame, a coring-spoon mounted on the carriage for right line movement relative thereto, and an arm pivoted to the carriage and having a pivotal connection with the coring-spoon, said arm having a projection entering the cam groove on the frame whereby the coring-spoon is moved as the carriage is reciprocated.

18. In a fruit parer, a fork reel, a plurality of forks therein, a knife-holder adjacent each fork and adjustable longitudinally thereof, and a trimming knife carried by each holder and adjustable thereon toward and from the corresponding fork.

19. In a fruit parer, a fork, means to rotate it, a knife-holder adjacent the fork and adjustable both longitudinally and laterally thereof, and a trimming knife adjustably carried by the knife-holder.

20. In a fruit parer, a fork-reel, a plurality of forks therein, a knife-holder adjacent each fork, each knife-holder having a bearing rib to engage the fork-reel, a knife adjustably carried by each knife-holder, and means to adjust each knife-holder about its rib to carry the knife toward and from the corresponding fork.

21. In a fruit parer, a fork-reel having a plurality of forks, a stop device for each fork to limit the movement of the fruit as it is placed thereon, and means to hold each stop device in one position when the corresponding fork is in position to receive the fruit, said means permitting the stop to have a backward movement when the fork-reel is turned to carry the fruit into position to be pared.

22. In a fruit parer, a rotary fork, a movable stop device to be engaged by the fruit as it is placed on the fork, thereby to properly position it and means to hold said stop in one position when the fork is in position to receive the fruit, said means permitting a backward movement of the stop when the fork begins to rotate.

23. In a fruit parer, a fork reel, a plurality of forks carried thereby, a movable push-off for each fork, and means to engage said push-off to hold the latter stationary while the fruit is being inserted on the fork, movement of the reel carrying said push-off out of engagement with said means whereby said push-off may have further backward movement.

24. In a fruit parer, a frame, a fork reel, a plurality of forks carried thereby, and a movable push-off for each fork, said frame having a portion to be engaged by each push-off as the fruit is being inserted on the corresponding fork whereby the push-off acts to position the fruit, movement of the reel carrying each push-off out of engagement with the frame to permit said push-off to move backwardly as the fruit begins to rotate.

25. In a fruit parer, a fork, a knife-holder associated with the fork and adjustable both longitudinally and laterally thereof, and a trimming knife adjustably mounted on the knife-holder for adjustment toward and from the fork.

26. In a fruit parer, a fork, a knife holder associated with the fork and adjustable both longitudinally thereof and toward and from the fork in one direction, and a trimming knife mounted on the knife holder for adjustment toward and from the fork in another direction.

In testimony whereof, I have signed my name to this specification, in the presence of two subscribing witnesses.

FRED G. MOWER.

Witnesses:
  M. J. ABBOTT,
  H. A. HURLIN.